(12) United States Patent
Auchmoody et al.

(10) Patent No.: US 10,192,207 B1
(45) Date of Patent: Jan. 29, 2019

(54) BACKEND CAPACITY EVALUATION FOR DEDUPLICATED STORAGE SYSTEMS

(71) Applicant: EMC Corporation, Hopkinton, MA (US)

(72) Inventors: Scott C. Auchmoody, Irvine, CA (US); Scott Ogata, Lake Forest, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 54 days.

(21) Appl. No.: 15/005,810

(22) Filed: Jan. 25, 2016

Related U.S. Application Data

(62) Division of application No. 13/863,268, filed on Apr. 15, 2013, now Pat. No. 9,361,321.

(51) Int. Cl.
  *G06F 7/00* (2006.01)
  *G06F 17/00* (2006.01)
  *G06Q 20/14* (2012.01)

(52) U.S. Cl.
  CPC .................. *G06Q 20/145* (2013.01)

(58) Field of Classification Search
  CPC ........... G06F 17/30289; G06F 11/1453; G06F 17/30156; G06F 11/1464; G06F 2201/84; G06Q 20/145
  See application file for complete search history.

(56) References Cited

U.S. PATENT DOCUMENTS

| | | | |
|---|---|---|---|
| 8,315,983 B1 | 11/2012 | Sumant et al. | |
| 9,361,321 B1 | 6/2016 | Auchmoody | |
| 10,042,715 B1 | 8/2018 | Auchmoody et al. | |
| 2002/0143855 A1 | 10/2002 | Traversat et al. | |
| 2007/0011153 A1 | 1/2007 | Pillai et al. | |
| 2009/0313447 A1 | 12/2009 | Nguyen | |
| 2011/0196842 A1 | 8/2011 | Timashev et al. | |
| 2011/0307657 A1 | 12/2011 | Timashev et al. | |
| 2012/0005688 A1 | 1/2012 | Kesavan et al. | |
| 2012/0066148 A1* | 3/2012 | Sagi | G06Q 40/06 705/36 R |
| 2012/0079499 A1* | 3/2012 | Gold | G06F 3/0607 718/105 |
| 2012/0284236 A1 | 11/2012 | Timashev | |
| 2014/0188808 A1 | 7/2014 | Wolf et al. | |

(Continued)

OTHER PUBLICATIONS

U.S. Appl. No. 13/826,549, filed Mar. 14, 2013, Buchman, et al.

(Continued)

*Primary Examiner* — Azam M Cheema

(74) *Attorney, Agent, or Firm* — Workman Nydegger

(57) ABSTRACT

One example method is directed to generating a data sampling parameter, and includes identifying an incremental billing rate for data storage, where the data storage includes a data set having a multiple data pieces that each correspond with a respective unique indicator, and the unique indicators reside in a space. The example method further includes identifying a threshold billing increment, and determining an acceptable error in the threshold billing increment. Finally, the method includes determining a sub sample ratio based upon the threshold billing increment and the acceptable error. The sub sample ratio has a variable value 'X' which indicates that sampling of one unique indicator in every 'X' unique indicators in the space is sufficient to determine the size of the entire data set.

20 Claims, 5 Drawing Sheets

(56) References Cited

U.S. PATENT DOCUMENTS

2014/0195848 A1     7/2014    Teli et al.
2014/0297776 A1* 10/2014    Volvovski ........... H04L 67/1097
                                                                                                          709/212

OTHER PUBLICATIONS

U.S. Appl. No. 13/863,268, filed Apr. 15, 2013, Auchmoody, et al.
U.S. Appl. No. 15/005,817, filed Jan. 25, 2016, Auchmoody, et al.
U.S. Appl. No. 13/826,549, Nov. 23, 2016, Office Action.
U.S. Appl. No. 15/005,817, Jan. 26, 2017, Office Action.
Notice of Allowance of U.S. Appl. No. 13/863,268, dated Mar. 30, 2016, filed Apr. 14, 2013.
Office Action of U.S. Appl. No. 13/826,549, dated Apr. 8, 2015, filed Mar. 14, 2013.
U.S. Appl. No. 61/748,001, filed Dec. 31, 2012.
Final Office Action of U.S. Appl. No. 13/826,549, dated Nov. 6, 2015, filed Mar. 14, 2013.
VMware, Data Recovery 1.0 Evaluator's Guide, retrieved from archive.org.
Office Action of U.S. Appl. No. 13/863,268, dated Nov. 19, 2015, filed Apr. 14, 2013.
U.S. Appl. No. 13/826,549, Feb. 2, 2018, Office Action.
U.S. Appl. No. 15/005,817, Apr. 11, 2018, Notice of Allowance.
U.S. Appl. No. 13/826,549, Jun. 6, 2018, Final Office Action.

* cited by examiner

BACKEND CAPACITY EVALUATION FOR DEDUPLICATED STORAGE SYSTEMS

RELATED APPLICATIONS

This application is a divisional of, and claims priority to, U.S. patent application Ser. No. 13/863,268, issued as U.S. Pat. No. 9,361,321, entitled BACKEND CAPACITY REPORT FOR DE-DUPLICATED STORAGE SYSTEMS, and filed Apr. 15, 2013. This application is also related to U.S. patent application Ser. No. 13/826,549, entitled DE-DUPLICATED FILE SHARE MOUNTING FOR GRANULAR LEVEL DATA RECOVERIES, filed Mar. 14, 2013 (the "'549 Application). All of the aforementioned applications are incorporated herein in their respective entireties by this reference.

FIELD OF THE INVENTION

Embodiments of the present invention relate to determining data storage requirements. More particularly, embodiments of the invention relate to systems and methods of generating a backend data storage capacity report in connection with the storage of data in systems such as data de-duplication storage systems.

BACKGROUND

The processes of backing up data and moving data are complex and complicated for several reasons. In general, while some data storage and backup systems are efficient and effective in the technical sense, those systems can present unique challenges in terms of the ability to implement an associated economic or commercial model that fits well with the technology.

In one particular example, a data de-duplication storage system can enable a service provider to more efficiently use available storage space by reducing or eliminating the storage of duplicate data. This result can be achieved even where, for example, two instances of the same piece of data belong to different respective customers. Thus, in the data de-duplication storage system, there may be no distinction drawn between customers. Rather, the de-duplication functionality may transcend customer boundaries and take a holistic view of all the data stored, or to be stored.

While data de-duplication can provide various benefits in terms of data storage, it may present problems if a decision is made to move customer data to a different de-duplication domain. Because that customer data may include data that is common to one or more other customers, whose data is not being moved to a different de-duplication domain, it can be difficult for the data storage service provider to determine how much back end storage space will be required for the customer data that is to be moved. Without information as to how much back end storage space is needed, the service provider may encounter problems if an attempt is made to move the data to a different de-duplication domain that has inadequate storage space. Alternatively, the service provider may not be able to move the data at all.

A related problem concerns the ability of the service provider to bill the customer for data storage services. In general, a service provider may charge customers at a set cost per unit of stored data for a certain time period. To illustrate, a service provider could charge a customer $5/Gbyte/month. However, if the service provider is unable to ascertain how much data belongs to that customer, it will be difficult for the service provider to accurately bill the customer.

In view of problems such as these, there is a need to be able to determine the amount of data that belongs to a particular customer. One possible way to make this determination in a data de-duplication storage system, for example, might be to simply track all of the hashes associated with a particular user, without counting the same hash twice, and then adding up the sizes of all of the data pointed to by those hashes. However, such an approach would be inefficient, both in terms of the calculation algorithm and, correspondingly, in terms of the processing resources that would be required.

To illustrate, using the aforementioned $5/Gbyte/month example, the storage cost for each byte would be $0.000000005/byte. However, the smallest amount that a customer can be charged is 1 cent, or $0.01, and given the exceedingly small cost per byte, there is little practical reason to calculate the exact number of bytes associated with a particular customer. Correspondingly, there is no practical reason to calculate the customer cost to any fractional amount smaller than 1 cent, or $0.01, such as millionths of a cent in the example noted above.

Thus, while the example approach noted above may provide information that can be used to determine the amount of data associated with a customer, as well as the incremental cost to store that data, the calculation would be highly inefficient and require the use of an inordinate amount of processing resources that could be utilized for other tasks. Moreover, the cost to obtain the results provided by the calculation would likely outweigh the benefit of having those results.

In light of the foregoing, it would be useful to be able to calculate the amount of data associated with a customer, without performing more calculations, or using more resources, than necessary, while also producing results that have an acceptable level of accuracy.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention generally relate to systems and methods for storing data. At least some embodiments are employed in connection with a data de-duplication storage domain that includes a backup server running a data de-duplication application. More particular example embodiments of the invention relate to systems and methods of generating a backend data storage capacity report in connection with the storage of data in systems such as data de-duplication storage domains.

Generation of a backend data storage capacity report may involve identifying a need to determine how much backend storage is used, or required, by a customer. Such a need can arise, for example, when the customer data has to be moved from one storage domain to another. Because billing may be based on the amount of storage capacity used by a customer, such a need may also arise when a storage service provider has to determine how much a particular customer should be billed for the storage space used by that customer.

Embodiments of the invention may enable a storage service provider to accurately determine the amount of storage used by each customer of a storage system, even if two or more of the customers have common data stored in that same storage system. Because customers may be billed on an individual basis for the total amount of storage that they use, regardless of whether some of their stored data is shared with one or more other customers, the storage provider can leverage the efficiency gains realized by data de-duplication by billing each customer for the total amount of data storage that each particular customer uses.

As well, embodiments of the invention may generate sufficiently accurate determinations of data storage used by a customer, or determinations of minimum acceptable accuracy, without requiring all of the customer data to be counted. Thus, such embodiments may enable more efficient use of processing resources, and may also provide the storage service provider with data storage capacity information relatively more quickly than if all of the customer data were to be counted.

In some embodiments of the invention, a sufficiently accurate determination of data storage used by a customer may be made by sub sampling the data associated with that customer. This determination may also be referred to in terms of having a minimum acceptable accuracy. Constraints used to determine the size of the sub sample may include the storage service provider billing rate per incremental amount of data, and the smallest incremental amount that can be billed to a customer.

A. Example Operating Environments

The following is a discussion of aspects of example environments in which embodiments of the invention may be employed. This discussion is not intended to limit the scope of the invention, or the applicability of the embodiments, in any way.

Figure 1:
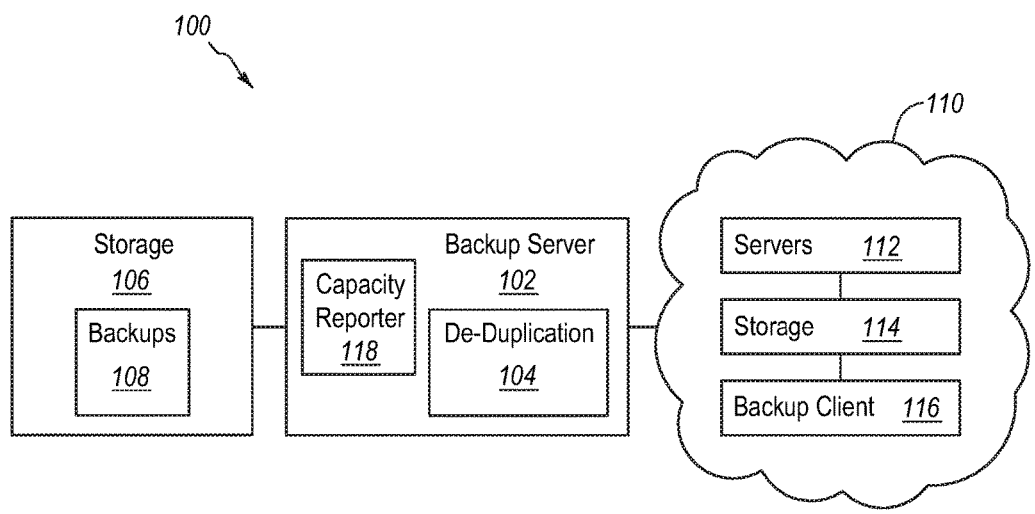
FIG. 1 is a block diagram of an example data de-duplication storage system.

FIG. 1 illustrates an example of a network or computer system 100 that includes a backup system configured to backup data in the network and/or to restore the data or a portion of the data to the network or to a specific target or destination in the network. FIG. 1 illustrates a network 110, which may be a local area network, a wide area network, or the like. The network 110 may be accessible over various networks using various devices and may communicate with the computer system 100. Devices present in the network 110 can include at least servers 112 and storage 114, which may be examples of computing devices or of computer hardware. The storage 114 can be integral with the servers 112 or separate from the servers. A backup client 116 may also be instantiated in the network 110. The servers 112 may also support virtualization and may be examples of nodes or hosts that are configured to support one or more virtual machines. The destination of a restore operation may be one of the servers 112, such as the storage 114 associated with one of the servers 112, or a virtualized environment. The restored data may be a virtual file system mounted on a virtual hard disk, for example, and the file system may be mounted on the virtual hard disk.

The backup client 116, for example, may be instantiated on at least one of the servers 112, or on another device in the network 110. The backup client 116 may also be present on a server that supports virtualization. The backup client 116 can backup virtual machines and associated virtual hard disks in addition to other data. In one instance, the backup client 116 may be instantiated on, for example, a server that is configured to support virtual machines.

FIG. 1 further illustrates a backup server 102 that is associated with storage 106, both of which may be part of the network 110. The storage 106 may be part of the storage 114 or may be separate from the storage 114. The storage 106 is configured to store backups of the applications/data/virtual machines in the network 110. The backups in the storage may be referred to as save sets or backups 108. The backups may have different formats and may be generated in different ways. In one example, the save sets or backups 108 include data images, partial backups, streaming backups, or the like.

Specific files may be restored from the backups 108. In one example, the save sets or backups 108 include virtual hard disks. The virtual hard disks from the backups 108 can be exposed on one of the servers 112 (the destination server) as a virtual file system by the backup client 116. These virtual hard disks can be mounted from the virtual file system on the destination server and the file system can also be mounted on these virtual hard disks. By mounting the virtual hard disk to a virtual file system, for example, the virtual hard disk is writeable and is made to be transactionally consistent. As a result, the virtual file system allows writing to the virtual hard disk it contains.

In addition, mounting a virtual hard disk may also include mounting one or more snapshots or differencing virtual hard disks. The backup client 116 manages the mounting of the virtual hard disk and any associated differencing virtual hard disks such that the differences in the differencing virtual hard disks are applied in the appropriate order. For example, if the virtual hard disk is associated with two differencing virtual hard disks, the backup client applies the two differencing virtual hard disks in a particular order.

By mounting the file systems on the virtual hard disks, which are examples of restored files, the files and directories can be browsed by a user and a single backup can be used for both image level recovery and file level recovery. Embodiments of the invention further enable the virtual hard disk to be both readable and writeable. The virtual hard disk may be writeable in order to mount the virtual hard disk in the virtual file system. A user can select specific files in the file system mounted in the restored virtual hard disk for recovery.

The servers 112 may include computing devices configured to operate as servers or that run applications including network-based applications. The servers 112 may include email servers, database servers, file servers, or the like. The servers 112 may also provide virtualization services and manage the operation of virtual machines. Some of the applications/servers may be operating on virtual machines. Some of the servers 112 may be used to establish virtual machines that may be used during the restoration of specific data. For example, a virtual hard disk included in the backups 108 may be mounted on a virtual file system on a server that is configured to support virtualization.

The storage 114 may be integrated with the servers 112 or may be separate from the servers 112. The storage 114 can include various types of storage configurations such as storage area networks (SANs), network-attached storage (NAS) and direct-attached storage (DAS), disk arrays, or the like. The storage can be abstracted to virtual machines.

The backup and/or restoration of data is conducted, in one example, by the backup client 116. The backup client 116 may coordinate with the backup server 102 to backup or restore data or access the storage 106 directly. In one example, the backup client 116 may interface with the backup server 102 or the storage 106 such that the backups 108 can be browsed to identify a particular virtual hard disk to mount. A user interface associated with the backup client 116 may enable the backups 108 to be browsed prior to granularly restoring the data in the backups 108. Granularly restoring data, in one example, refers to the ability to restore sub-sets of data without having to restore an entire save set or an entire backup.

During the backup process, the backup server 102 may also de-duplicate the data using a de-duplication application 104, which may alternatively be implemented on another server or which may be integrated with the backup client 116. The de-duplication module 104 is configured to de-duplicate the data that is included in the backups 108. The de-duplication application 104 may reduce redundant data in the storage capacity of the storage 106 or more specifically in the backups 108. The de-duplication application 104 identifies redundant data and replaces, in one example, some of the copies of the redundant data with a reference/pointer to a copy of the data that is stored elsewhere in the storage 106. In other systems, the de-duplication may use hash values and file offsets. Hash values can be used to identify unique blocks of data and file offsets may identify the location of the unique blocks of data in the backups 108.

For instance, the servers or the virtual machines in the network 110 may implement identical operating systems ("OSes") that include many identical files, executables, or other blocks of data. Some of the data used in the various virtual machines may also be identical. In this case, the de-duplication application 104 identifies the identical blocks of data, eliminates redundant copies from the storage 106, and stores pointers (or offset values) at the former locations of the redundant copies pointing to a single remaining instance of the data.

The de-duplication application 104 is provided in the computer environment 100 and may have access to the storage 106. The de-duplication application 104 processes data stored in storage 106 to identify and reduce redundant data. The data can be de-duplicated prior to being stored in the backups 108, while being stored in the backups 108, or after being stored in the backups 108. The de-duplication application 104 can be any de-duplication application configured to identify redundant data and replace the redundant data with one or more offsets, or pointers or references pointing to a single instance of the data.

For example, the de-duplication application 104 de-duplicates data in-line. In other words, the de-duplication application 104 identifies and replaces redundant data with pointers as the data is ingested/written into the storage 106. In other instances, the de-duplication application 104 de-duplicates data post-process. That is, the de-duplication application identifies and replaces redundant data with pointers after the data has already been ingested/written into the storage 106. Additionally, the de-duplication application 104 can de-duplicate data using a fixed block size or a variable block size or both.

The de-duplication application 104 can de-duplicate data in all or only a portion of the aggregate storage capacity of the storage 106. For instance, a portion of the aggregated storage can be allocated as a backup storage target. Alternately, it may be desirable to present a representation of all of the shared storage capacity to the de-duplication application 104 in order to globally de-duplicate data stored in the aggregate storage capacity. Thus, more efficient utilization of storage capacity may be achieved as a result of the de-duplication of redundant data.

Moreover, not only can files associated with a single virtual hard disk be restored, but restoration of files from multiple virtual hard disks is also possible. In one example, a particular backup may include more than one virtual hard disk and a user may be able to select one or more of the virtual hard disks during a restore operation. Further details concerning examples of data de-duplication systems and data de-duplication methods with which embodiments of the invention may be employed are disclosed in the '549 Application.

B. General Aspects of Example Backend Capacity Reporters

With continued reference to FIG. 1, a capacity reporter 118 may be included in the backup server 102, or in any other suitable environment. In general, the capacity reporter 118 is operable to generate a backend capacity report that indicates how much storage is used by one or more customers whose data is stored in a particular location, such as in the backup server 102, or elsewhere. The report may be used, for example, in connection with billing procedures, as well as to determine whether or not customer data can be moved to another storage domain, such as a de-duplicated storage domain.

The capacity reporter 118 may generate reports on an ad-hoc basis, and/or according to a regular schedule. Further, reports produced by the capacity reporter 118 can be generated automatically and/or in response to user input, such as by way of a UI for example, and/or other input. For example, the occurrence of particular events in the computer system 100 such as, for example, a request to move customer data from one storage domain to another storage domain, may trigger the generation of a report by the capacity reporter 118 indicating the amount of data associated with that customer and/or whether or not the prospective destination of that customer data has adequate storage capacity.

As another example, movement of additional customer data to a particular storage domain may trigger the generation of a report by the capacity reporter 118 that includes an update as to the amount of storage capacity used by that customer in the original domain and/or the destination domain. Likewise, movement of customer data from a particular domain may trigger the generation of a report by the capacity reporter 118 that includes an update as to the amount of storage capacity used by that customer in the original domain and/or the destination domain.

Report generation by the capacity reporter 118 may be triggered by, or otherwise associated with, any variable or combination of variables relating to data storage and movement, and the associated computing environments. Any of these variables, or combinations thereof, may constitute inputs to the capacity reporter 118 and/or to a report generation process. Examples of such variables include, but are not limited to, customer identity, type of stored data, amount of stored data, changes to an amount of stored data, destination domain, origination domain, date and/or time of planned or actual data movement, storage capacity of an origination domain, storage capacity of a destination domain, billing rates, changes in billing rates, the amount of data common to two or more customers, or changes to that amount of common data.

Moreover, the capacity reporter 118 can control, or cause the control of, data movement within a domain such as a de-duplication storage domain. To illustrate, if a request is made to transfer data, the capacity reporter 118 may prevent the transfer, or at least issue a warning, if the capacity reporter determines that there may be insufficient storage capacity at the destination domain. Even if there is adequate capacity, the capacity reporter 118 may issue a warning if the margin between the available capacity at the destination and the amount of data intended to be stored is below a certain threshold.

C. De-Duplicated Storage System Considerations

Figure 2:
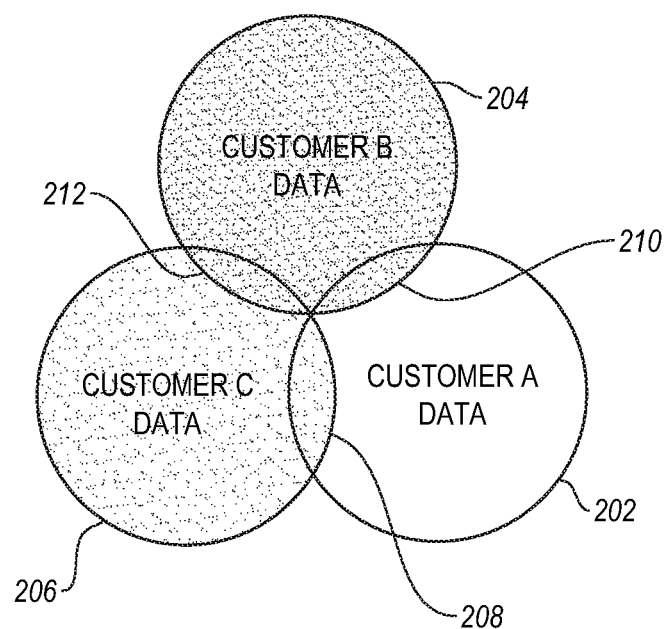
FIG. 2 is a diagram illustrating commonality of data between one or more users of a data de-duplication storage system.

With attention now to FIG. 2, additional details are provided concerning selected characteristics of some de-duplicated storage systems. These characteristics are provided by way of example only and are not intended to limit the scope of the invention in any way.

As noted elsewhere herein, de-duplicated storage systems may be advantageous insofar as they eliminate the need to store multiple copies of data that may be common to one or more customers. For example, and as illustrated in FIG. 2, multiple customers of a data storage service provider, such as Customer A, Customer B, and Customer C, may each have a respective set of data 202, 204, 206, that is being stored, or will be stored. For various reasons however, there may be data that is common to two or more of the customers. This commonality is denoted by the various overlapping portions 208, 210 and 212 of the data 202, 204, and 206. As also indicated by the overlapping portions 208, 210, and 212, the extent to which data is common can vary between customers.

Data de-duplication thus introduces storage efficiencies for the storage service provider because it is only necessary to store one copy of common data. Because of the existence of such commonality however, it can be difficult to determine how much backend storage is used by a particular customer.

D. Example Methods for Calculating Backend Capacity

Figure 3:
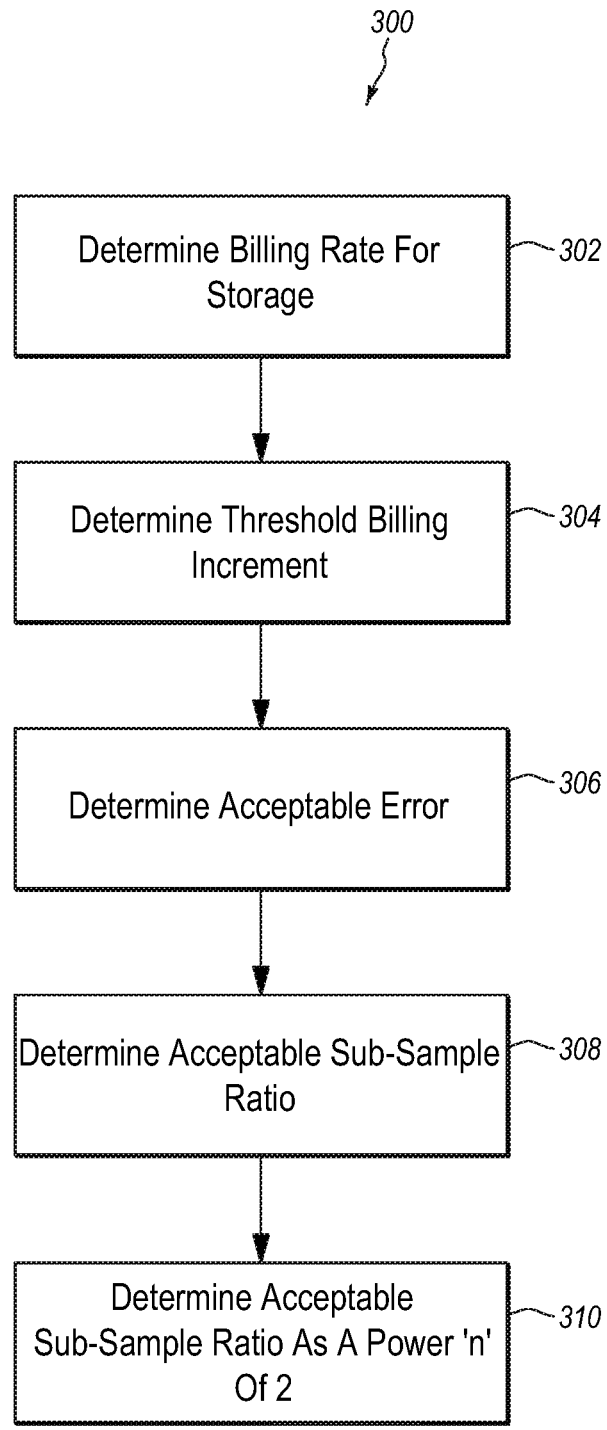
FIG. 3 is a flow diagram of an example method for determining a sub sample ratio for sampling customer data.

With attention now to FIG. 3, details are provided concerning some example methods for determining how much backend storage capacity is used by a particular customer. In general, the example methods do not require that all data associated with a customer be calculated. Instead, a sample of the customer data, or pointers to the data, can be taken that, if of sufficient size, will provide results of acceptable accuracy. Following is a discussion of aspects of some example methods.

The example method 300 is a method for determining a sub sample ratio for sampling customer data. In general, the sub sample ratio can be used to facilitate generation of a suitably accurate count of customer data, through the use of a data sample that is smaller than the total amount of data associated with the customer. That is, sub sampling is a way to reduce the total number of customer data pieces, or associated pointers such as hashes, that must be examined in order to determine how much storage space is required for the data of that particular customer. These data pieces can be any size or type.

In at least some example embodiments, the customer data pieces may be referred to, for example, as Level 0 segments, or atomic data. Level 0 segments and atomic data, respectively, are examples of the smallest unit of data present in certain environments. In some environments, the term 'chunk' is used to refer to a piece of atomic data while, in other environments, the term 'segment' is used to refer to a piece of atomic data. In any case, multiple pieces of atomic data may be combined to form composite data. Moreover, the scope of the invention is not limited to any particular domain, environment, or type of atomic data.

In any case, the sub sample ratio can then be used as a basis for determining, within an acceptable range of accuracy, how much data is associated with that customer and, thus, how much storage space that customer data requires. Thus, embodiments of the invention may be advantageous inasmuch as they obviate the need to count every piece of customer data to determine the storage requirements for that customer. The usefulness of such embodiments may be further enhanced by the fact that duplicate data that the customer has in common with one or more other customers need not be calculated because the duplicate data does not require additional storage space.

The space for which the sub sample ratio is to be determined can be any space associated with the customer data that is to be counted. By way of illustration, the space in one example embodiment is a hash space associated with the customer data. In some embodiments, the hash space includes a plurality of hash values that are each probabilistically unique to a respective data piece, or combination of data pieces. The hash value can be derived from, or otherwise based upon, the data piece(s) to which it points by any suitable hash function. By virtue of its uniqueness, the hash value can be thought of as a fingerprint of the data to which it points. More generally however, any unique indicator that is based upon the data piece(s) to which it points can be employed, and the scope of the invention is not limited to the use of hash functions, hash values, or hash spaces.

In general, the sub sample ratio is the ratio of the total amount of customer data to the number of bytes, for example, identified in a sub sampling process. Where, as in this example, the population size, that is, the total amount of customer data, is the parameter which is to be determined, the sub sample ratio and the number of bytes identified by sub sampling must be known, or determinable.

In at least some example embodiments, determination of the sub sample ratio is made with reference to a data storage billing rate. However, there are a variety of ways to determine the sub sample ratio, and the scope of the invention is not limited to any particular method for doing so, nor is the scope of the invention limited to the use of any particular constraint(s), such as billing rate, for determining a sub sample ratio.

With particular reference now to FIG. 3, aspects of an example method for determining a sub sample ratio are disclosed. While the example of FIG. 3 concerns determination of a sub sample ratio based on data storage billing rates, the scope of the invention is not limited to that methodology and, more broadly, any other method or criteria suitable for determining a sub sample ratio may instead be employed.

In the example method 300 of FIG. 3, a billing rate is first determined 302 for data storage. In general, the billing rate is the cost charged by a storage service provider to a customer to store a unit of customer data for a particular amount of time. To illustrate, if a storage service provider bills a customer for data storage at the rate of $5/Gbyte/month, the per byte cost of storage for the customer is $0.000000005/byte/month.

At 304, a determination is made as to a threshold billing increment, that is, the smallest increment in which a customer will be billed by the storage service provider. In one particular example, the smallest increment used for billing a customer can be $0.01, although any other billing increment, such as $0.10, $1.00, or $10.00 for example, could be used instead.

To continue with the example minimum billing increment of $0.01, any sub sample ratio that produces an error less than $0.01 will produce statistically valid results, since the customer cannot, or will not, in the case of larger billing increments, be billed a smaller amount. Accordingly, in this example, an acceptable error is determined 306 that is based on the minimum billing increment. In particular, an error of $0.001 is acceptable because it is less than the billing increment.

The acceptable error and the storage billing rate are then used to determine 308 an acceptable sub sample ratio. In particular, an error of no more than $0.001, divided by the billing rate of $0.000000005/byte/month, produces an initial sub sample ratio value of 200,000. Because the error of no more than $0.001 is less than the billing increment of $0.01, the sub sample ratio of 200,000 will produce valid, that is, sufficiently accurate, results.

As noted elsewhere herein, at least some systems and environments involve the use of atomic data, one example of which is a chunk of data. Because each chunk of data in this example is represented by a hash, the initial sub sampling ratio, 200,000 in this example, must be divided by the average chunk size. The chunk size can vary from one domain to another. However, in this particular example, the initial sample ratio of 200,000 is divided by 24576, the average size of a chunk in this particular implementation. This calculation yields a final sub sampling ratio of 8.1 to 1. This means that only one of every 8 hashes in a hash space needs to be examined to be able to determine, with the requisite degree of accuracy, the total amount of customer data.

In some instances at least, it is useful to be able to express the sub sample ratio as a power 'n' of 2, namely, $2^n$. Continuing with the example noted above, and noting that sub sample ratios exceeding 8 will not, or may not, produce acceptably accurate results, the maximum sub sample ratio that can be used, expressed as a power of 2, is determined at 310 as $2^3$ or 8. That is, only one hash in every 8 hashes in the hash space will be checked. Another way to express this is that hashes in the hash space are sampled by looking only at hashes where the lowest 3 bits, or 3 least significant bits, are zero. The next power of 2, namely $2^4$, is 16. As this number exceeds 8.1, a sub sample ratio of 24 is too large and if only one hash in every 16 is sampled, the resulting sample may not produce acceptably accurate results. Sub sampling datasets is only valid if the number of samples is large enough for a given dataset. The formula for deriving this number of samples is derived from the acceptable Error margin "E," the % of Confidence in the result "C," and the standard deviation of the dataset "S." The formula for the minimum sample set size is $n=(C*S/E)^2$. This formula is derived from the two fundamental theorems of statistics, "The Law of Large Numbers" and "The Central Limit Theorem."

In another example domain, a segment, rather than a chunk, is used for calculation of a sub sampling ratio. In this example, the segment size is approximately 8K, or 8192. Of course, the scope of the application is not limited to any particular type of domain, nor to any particular size(s) of data used to calculate a sub sample ratio.

Figure 4:
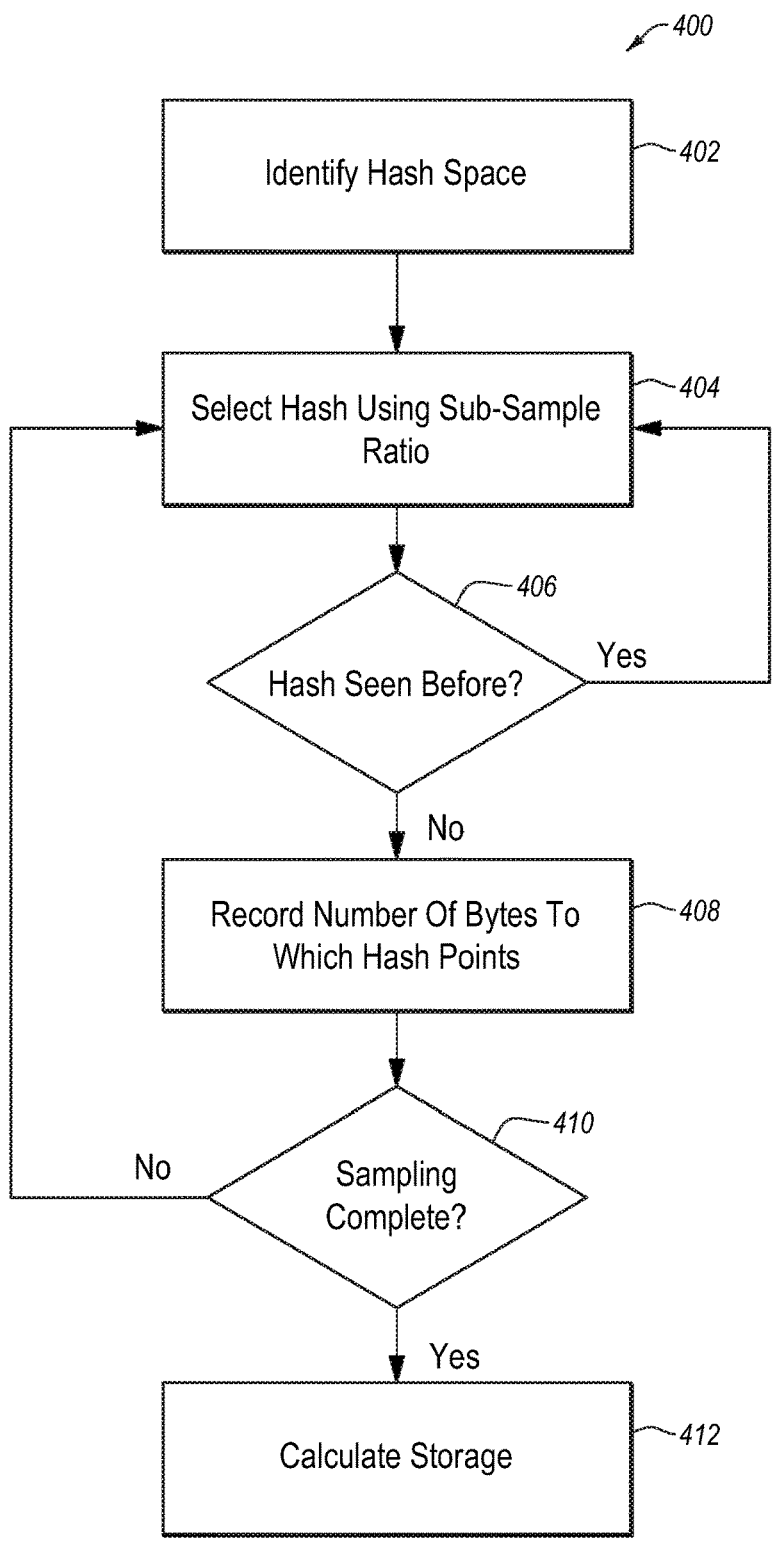
FIG. 4 is a flow diagram of an example method that can be used to sub sample a hash space and determine the total amount of customer data.

In any case, once the sub sample ratio has been determined, the method 400 of FIG. 4 can be used to sub sample the hash space and determine the total amount of customer data. In general, the customer data pieces are sub sampled based upon their respective hash. As noted elsewhere herein, the size of data piece sampled can be any size. In one example method, atomic data are sampled, although composite data could also be sampled.

At 402, the hash space of interest is identified. In general, the hash space is a space where hashes of the customer data to be counted reside. As used herein, the customer data can include all customer data, or some subset of the customer data, such as customer data stored in a particular location or domain. Once the hash space is identified 402, the data segments can be sub sampled based upon their hash, and using the sub sample ratio.

Thus, for a sub sample ratio of $2^3$ for example, one hash in every 8 hashes in the hash space will be checked 404. Once a hash is identified for checking, an inquiry is made 406 as to whether the data to which that hash points have occurred previously in a backup data stream. By way of illustration, a desktop backup may have about 0.3% new data, so 99.7% of the data for a given backup of that desktop will be the same, day over day.

There are a variety of ways to determine if the data to which a particular hash corresponds have previously occurred in the backup stream. For example, a Bloom filter can be used to determine whether or not a particular hash represents or points to data that has not previously occurred in the backup stream. Alternatively, a hash map, which correlates hashes with the data piece(s) to which they correspond, can be used to make such a determination. More generally, any other mechanism(s) or method(s) can be employed that enable a determination to be made as to whether or not data associated with a given hash have been previously seen in the backup data stream, and the scope of the invention is not limited to the aforementioned examples.

If the answer to the inquiry 406 is YES, the method 400 returns to 404 and another hash in the hash space is selected. On the other hand, if the answer to the inquiry 406 is NO, the method proceeds to 408 where the number of bytes to which the hash points are recorded. A further inquiry 410 is made as to whether or not sampling of the hash space has been completed. One way to do this is through the use of a cryptographic hash algorithm that has an even distribution across the hash space. Use of a cryptographic hash algorithm, such as "sha1" for example, to create hashes of the customer data, enables a reliable determination that the entire hash space that contains those hashes has been sampled. In some instances, a customer data backup to which the hash space corresponds is represented by a Merkle tree. The sub sampling algorithm can be thought of as enumerating, or 'walking over,' each hash in the Merkle tree until the entire hash space has been examined.

If the answer to the inquiry 410 is NO, the method 400 returns to 404. However, if the answer to the inquiry 410 is YES, the amount of storage needed for the customer data can then be calculated 412. In particular, the total number of bytes identified at each occurrence of 408 is added together, and the resultant sum is then multiplied by the sub sample ratio, $2^3$ in the example set forth above, to determine to the total amount of customer data and, thus, the required storage space for that data. Once the required amount of storage space for the customer is known, the customer can then be billed accordingly by the storage service provider.

E. Example Sub Sampling and Calculation Algorithm

It will be appreciated that a variety of algorithms could be used to implement the methods, such as method 400, disclosed herein. Accordingly, one illustrative example of a sub sampling algorithm is set forth below.

As noted above, sub sampling is one example of a method to reduce the total number of data, which are atomic data in some embodiments, that need to be looked at. That is, sub sampling enables an accurate count of data to be made, notwithstanding that each unit of data is not individually counted. Thus, sub sampling may be advantageous inasmuch as it produces acceptably accurate results in relatively less time than would be required in a byte-by-byte count, for example. In the example algorithm below, sub sampling is performed at the Level 0 ("L0") segment, or Atomic segment, level by only looking at hashes where the 'n' least significant bits are zero. As noted elsewhere herein, the smallest amount of data may be denoted differently depending upon the relevant environment. Thus, L0 and Atomic refer to the smallest amount of data in different respective environments.

The example sub sampling and calculation algorithm is as follows:
double subsample_ratio; // (the sub sampling ratio in this algorithm must be an integer power of 2)
int n=ln(s)/ln(2); // (the number of bits of a hash that must be zero to merit inspection)
Initialize Bloom filter B=0
Total_size=0
For all customer files $F_i$
Enumerate Lp of $F_i$ down to L0
if(L0.hash.lower_bits(n)==0) {
   If(L0 does not exist in Bloom filter B) {
   Total_size+=L0.size( ) set L0 in B
   }
}
Total_size=Total_size*subsample_ratio;
Where:
'n' is the log base 2 of the sub sampling ratio;
'F' is a set of all the customer backups (Fi is the ith customer backup);
'Lp' represents all of the intermediate levels of the backup in the Merkle tree; and
'L0' refers to a Level 0 segment.

F. Example Method for Valuing Storage Capacity

Figure 5:
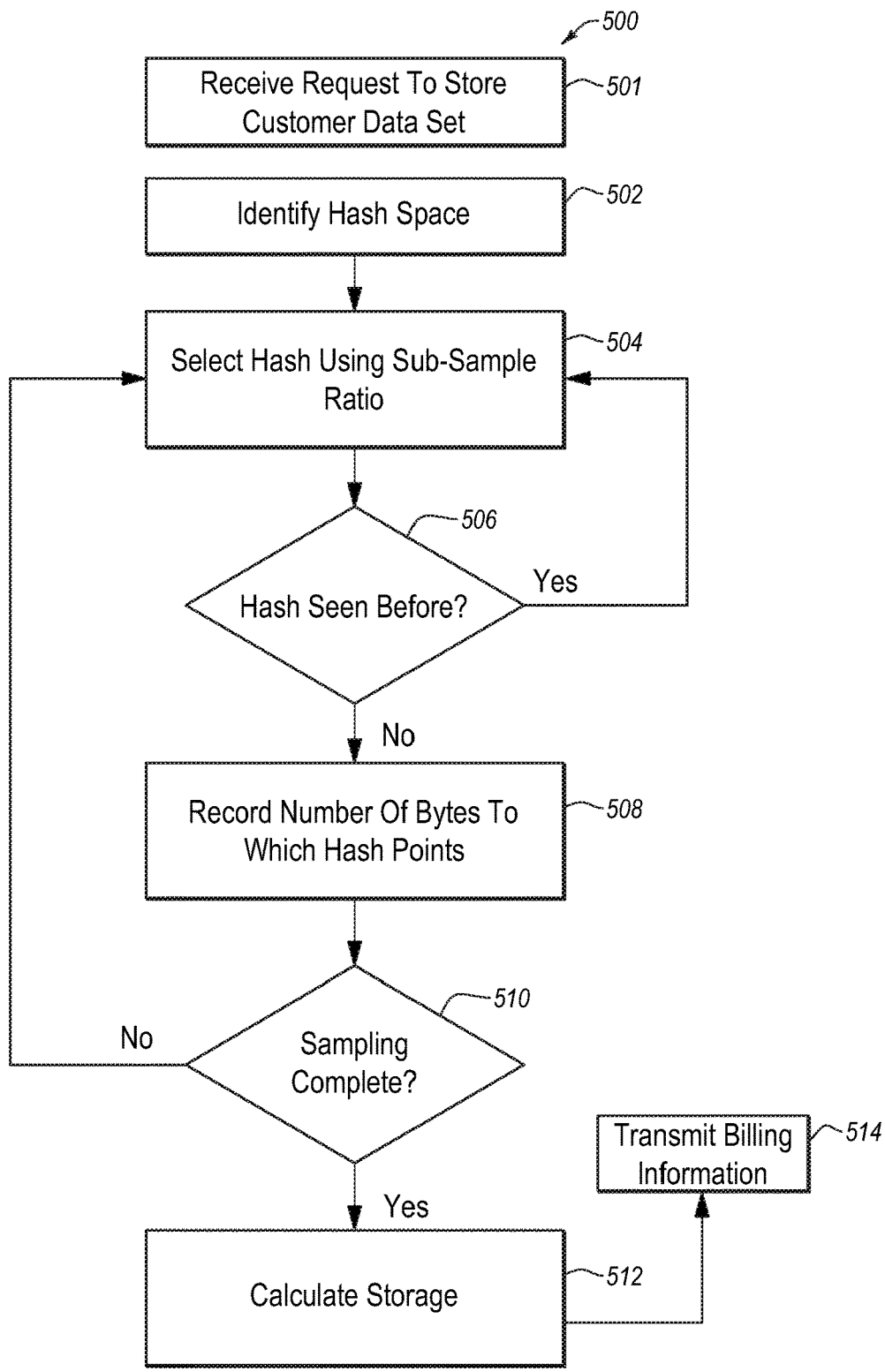
FIG. 5 is a flow diagram of an example method for valuing storage capacity.

With reference now to FIG. 5, aspects of a method 500 for valuing storage capacity are disclosed. The example method 500 begins when to a request is received 501 to store a customer data set. The request may be received, for example, by a capacity reporter located at a backup server, as disclosed in FIG. 1 for example. The request may be transmitted by a client, or other entity in a computer system such as computer system 100 and/or a network, such as network 110. The request to store a customer data set may take any of a variety of forms. For example, a request to store a customer data set may take the form of a request to move a data set from, for example, one de-duplicated storage domain, the originating domain, to another de-duplicated storage domain, the destination domain.

After the request has been received, the method 500 proceeds largely in the same fashion as the method 400. Thus, processes 502-512 correspond, respectively, with processes 402-412 of method 400.

Once the required data storage capacity has been calculated 512, the method 500 moves to 514 where billing information corresponding to the calculated data storage capacity is transmitted. The billing information may be transmitted by the data storage service provider to the requestor that transmitted the request for storage at 501, and/or the billing information may be transmitted to other entities as well. In some instances at least, the billing information includes the product of the calculated data storage capacity and the data storage rate charged by the data storage service provider. This product may be the amount periodically charged, such as monthly, by the data storage service provider for the calculated storage capacity.

G. Example Computing Devices and Associated Media

The embodiments disclosed herein may include the use of a special purpose or general-purpose computer including various computer hardware or software modules, as discussed in greater detail below. A computer may include a processor and computer-readable media carrying instructions that, when executed by the processor and/or caused to be executed by the processor, perform any one or more of the methods disclosed herein.

As indicated above, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    determining how much storage space is used by a data set of a customer, by performing operations comprising:
        identifying an incremental billing rate for data storage, wherein the data set is stored in the data storage, and the data set includes a plurality of data pieces that each correspond with a respective unique indicator, and wherein each unique indicator resides in a space;
        identifying a threshold billing increment;
        determining an acceptable error in the threshold billing increment; and
        determining a sub sample ratio based upon the threshold billing increment and the acceptable error, wherein the sub sample ratio has a variable value 'X' which indicates that sampling of one unique indicator in every 'X' unique indicators in the space is sufficient to determine a size of the entire data set; and
    using information about how much storage space is used by the data set of the consumer as a basis to control storage of the customer data set.

2. The method as recited in claim 1, wherein the sub sample ratio is determined by dividing the acceptable error by the incremental billing rate.

3. The method as recited in claim 1, wherein the sub sample ratio is an initial sub sample ratio, and the method further comprises determining a final sub sample ratio based on the initial sub sample ratio.

4. The method as recited in claim 3, wherein the final sub sample ratio is the largest value of $2^n$ that is less than or equal to the initial sub sample ratio, where 'n' is an integer power.

5. The method as recited in claim 1, wherein the sub sample ratio is a ratio of the amount of data in the data set to an amount of data sampled from the data set.

6. The method as recited in claim 1, wherein a portion of the data in the data set is deduplicated data that is shared by multiple users.

7. The method as recited in claim 1, wherein the data pieces are segments, chunks, composite data, or atomic data.

8. The method as recited in claim 1, wherein each unique indicator is a hash of a respective data segment to which that unique indicator corresponds, and the space is a hash space.

9. A non-transitory storage device having stored therein computer-executable instructions which, when executed by one or more hardware processors of a computing system, perform the following:
    determining how much storage space is used by a data set of a customer, by performing operations comprising:
        identifying an incremental billing rate for data storage, wherein the data set is stored in the data storage, and the data set includes a plurality of data pieces that each correspond with a respective unique indicator, and wherein each unique indicator resides in a space;
        identifying a threshold billing increment;
        determining an acceptable error in the threshold billing increment; and
        determining a sub sample ratio based upon the threshold billing increment and the acceptable error, wherein the sub sample ratio has a variable value 'X' which indicates that sampling of one unique indicator in every 'X' unique indicators in the space is sufficient to determine a size of the entire data set.

10. The non-transitory storage device of claim 9, wherein the sub sample ratio is determined by dividing the acceptable error by the incremental billing rate.

11. The non-transitory storage device of claim 9, wherein the sub sample ratio is an initial sub sample ratio, and the method further comprises determining a final sub sample ratio based on the initial sub sample ratio.

12. The non-transitory storage device of claim 11, wherein the final sub sample ratio is the largest value of $2^n$ that is less than or equal to the initial sub sample ratio, where 'n' is an integer power.

13. The non-transitory storage device of claim 9, wherein the sub sample ratio is a ratio of the amount of data in the data set to an amount of data sampled from the data set.

14. The non-transitory storage device of claim 9, wherein a portion of the data in the data set is deduplicated data that is shared by multiple users.

15. The non-transitory storage device of claim 9, wherein each unique indicator is a hash of a respective data segment to which that unique indicator corresponds, and the space is a hash space.

16. A backup server, comprising:
    one or more hardware processors;
    data storage holding backup data;
    a data deduplication application; and
    a capacity reporter application operable to generate a backend capacity report indicating how much storage is used by the backup data, the capacity reporter application comprising computer-executable instructions stored on a non-transitory storage device and which, when executed by one or more of the hardware processors, perform the following:
    determining how much storage space is used by a data set of a customer, by performing operations comprising:
        identifying an incremental billing rate for data storage, wherein the data set is stored in the data storage, and the data set includes a plurality of data pieces that each correspond with a respective unique indicator, and wherein each unique indicator resides in a space;
        identifying a threshold billing increment;
        determining an acceptable error in the threshold billing increment; and
        determining a sub sample ratio based upon the threshold billing increment and the acceptable error, wherein the sub sample ratio has a variable value 'X' which indicates that sampling of one unique indicator in every 'X' unique indicators in the space is sufficient to determine a size of the entire data set.

17. The backup server as recited in claim 16, wherein a portion of the backup data is deduplicated data.

18. The backup server as recited in claim 16, wherein a request to move customer data from a first storage domain to a second storage domain triggers generation of a report by the capacity reporter that includes an update as to the amount of storage capacity used by that customer in the first storage domain and/or the second storage domain.

19. The backup server as recited in claim 16, wherein movement of customer data from a first storage domain to a second storage domain triggers generation of a report by the capacity reporter that includes an update as to the amount of storage capacity used by that customer in the first storage domain and/or the second storage domain.

20. The backup server as recited in claim 16, wherein the capacity reporter controls data movement within a deduplication storage domain.

* * * * *

UNITED STATES PATENT AND TRADEMARK OFFICE
CERTIFICATE OF CORRECTION

PATENT NO. : 10,192,207 B1  
APPLICATION NO. : 15/005810  
DATED : January 29, 2019  
INVENTOR(S) : Auchmoody et al.

Page 1 of 1

It is certified that error appears in the above-identified patent and that said Letters Patent is hereby corrected as shown below:

On the Title Page

Item (57), Abstract, Line 4, change "having a multiple" to –having multiple–

Signed and Sealed this  
Eleventh Day of June, 2019

Andrei Iancu  
*Director of the United States Patent and Trademark Office*